US012281766B2

(12) United States Patent
Codabux

(10) Patent No.: US 12,281,766 B2
(45) Date of Patent: Apr. 22, 2025

(54) BRACKET FOR LINEAR LUMINAIRES

(71) Applicant: SIGNIFY HOLDING B.V., Eindhoven (NL)

(72) Inventor: Muhammad Shariq Codabux, Burnaby (CA)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/727,902

(22) PCT Filed: Jan. 17, 2023

(86) PCT No.: PCT/EP2023/050967
§ 371 (c)(1),
(2) Date: Jul. 10, 2024

(87) PCT Pub. No.: WO2023/139052
PCT Pub. Date: Jul. 27, 2023

(65) Prior Publication Data

US 2025/0075867 A1 Mar. 6, 2025

Related U.S. Application Data

(60) Provisional application No. 63/301,542, filed on Jan. 21, 2022.

(30) Foreign Application Priority Data

Feb. 3, 2022 (EP) .................................... 22154879

(51) Int. Cl.
*F21S 4/28* (2016.01)
*F21V 21/005* (2006.01)
(Continued)

(52) U.S. Cl.
CPC .............. *F21S 4/28* (2016.01); *F21V 21/005* (2013.01); *F21V 21/025* (2013.01); *H01R 25/14* (2013.01)

(58) Field of Classification Search
CPC ........ F21S 4/28; F21V 21/005; F21V 21/025; H01R 25/14
See application file for complete search history.

(56) References Cited

U.S. PATENT DOCUMENTS 5,628,557 A 5/1997 Huang
8,313,212 B1 11/2012 Mayer et al.
(Continued)

FOREIGN PATENT DOCUMENTS

CN 101033835 A 9/2007
CN 201051099 Y 4/2008
(Continued)

*Primary Examiner* — Zheng Song
*Assistant Examiner* — Glenn D Zimmerman

(57) ABSTRACT

A bracket (220) for a linear luminaire (100), the bracket (220) comprising: a body (280) having a top body wall (222), first and second side body walls (227-1, 227-2) that extend downward from the top body wall (222), each side body wall (227-1, 227-2) comprising a flange (228-1, 228-2) that extends outward from a bottom of the first and second side body walls (227-1, 227-2), and a tab (230) that extends outward from a rear of the first or second side body walls (227-1, 227-2), wherein the top body wall (222) and the first and second side body walls (227-1, 227-2) form a cavity (290) that extends along a length of the body (280).

15 Claims, 9 Drawing Sheets

(51) Int. Cl.
*F21V 21/02* (2006.01)
*H01R 25/14* (2006.01)

(56) References Cited

U.S. PATENT DOCUMENTS

| | | | | |
|---|---|---|---|---|
| 10,801,709 | B1 * | 10/2020 | Schultz | F21V 21/36 |
| 2019/0041041 | A1 * | 2/2019 | DeBruin | F21V 21/025 |
| 2019/0088241 | A1 * | 3/2019 | Czech | F21S 8/061 |
| 2020/0271289 | A1 * | 8/2020 | Lang | F21V 21/005 |
| 2021/0148531 | A1 | 5/2021 | Donnelly et al. | |
| 2022/0120392 | A1 * | 4/2022 | Wang | F21K 9/275 |

FOREIGN PATENT DOCUMENTS

| | | | |
|---|---|---|---|
| CN | 107477529 | A | 12/2017 |
| DE | 202015100867 | U1 | 3/2015 |
| DE | 10219135021 | A1 | 6/2021 |
| EP | 3106745 | A1 | 12/2016 |
| EP | 3617581 | A1 | 3/2020 |
| WO | 2021057941 | A1 | 4/2021 |
| WO | 2021089365 | A1 | 5/2021 |

* cited by examiner

BRACKET FOR LINEAR LUMINAIRES

CROSS-REFERENCE TO PRIOR APPLICATIONS

This application is the U.S. National Phase application under 35 U.S.C. § 371 of International Application No. PCT/EP2023/050967, filed on Jan. 17, 2023, which claims the benefit of European Patent Application No. 22154879.5, filed on Feb. 3, 2022, and U.S. Provisional Application No. 63/301,542, filed Jan. 21, 2022. These applications are hereby incorporated by reference herein.

TECHNICAL FIELD

The present disclosure relates generally to linear luminaires, and more particularly to systems, methods, and devices for brackets for linear luminaires.

BACKGROUND

Linear luminaires can be mounted in any of a number of ways, including but not limited to suspended from a ceiling, mounted directly to a ceiling, mounted directly to a wall, suspended from a bracket, and mounted directly to a bracket. For each of these types of mountings for linear luminaires, different hardware is required. This hardware must perform the functions of supporting the linear luminaire, providing a top cover pan, and having a minimal impact of wire cavity reduction within the linear luminaire. When two linear luminaires must be abutted against each other end-to-end to extend the overall length of the light fixture, even more hardware is needed.

US20200393100A1 relates to LED based lighting systems, such as surface mounted lighting systems and lighting systems that can connected to an existing grid structure. These lighting systems can be utilized in many settings, for example, as primary lighting systems for a commercial building and for retrofit lighting improvement purposes. Devices according to the present disclosure provide lighting systems capable of mounting to an existing surface, such as a T-bar ceiling structure. These devices can further comprise modular elements which facilitate connections of multiple lighting body components, allowing for multiple lighting arrangements and providing a cost effective and easily configurable lighting design. In some embodiments, multiple lighting components can be attached together by movable joints, allowing further user control over light distribution from the lighting systems.

US20210388974A1 relates to an LED support clip enables mounting of light-emitting diode (LED) modules onto support elements which may be pre-existing, such as tubing, while avoiding problems with current mounting methods. One or more LED light modules may be clamped into the LED support clip without the need for adhesives or screws, thereby forming an LED light assembly. One or more LED light assemblies may be clamped onto the support element. The LED support clip may comprise multiple clamps configured with spring tension jaws designed into the manufacturing process of the LED support clip. Support elements may be oriented horizontally, vertically or at various angles and may have a variety of cross-sectional shapes, including: square, triangular, rectangular, pentagonal, hexagonal, "I"-shaped, "L"-shaped, and round, over a wide cross-sectional dimension range.

SUMMARY

In general, in one aspect, the disclosure relates to a bracket for a linear luminaire, where the bracket includes a body having a top body wall, a first side body wall that extends downward from a first side of the top body wall, and a second side body wall that extends downward from a second side of the top body wall. The bracket can also include a first flange that extends outward from a bottom of the first side body wall, where the first flange is configured to be slidably disposed within a first slot in a first side housing wall of a housing of the linear luminaire. The bracket can further include a second flange that extends outward from a bottom of the second side body wall, where the second flange is configured to be slidably disposed within a first slot in a second side housing wall of the housing of the linear luminaire. The bracket can also include a tab that extends outward from a rear of the first side body wall or the second side body wall, where the tab is configured to slidably abut against a protrusion in the first side housing wall or the second side housing wall of the housing of the linear luminaire. The top body wall, the first side body wall, and the second side body wall can form a cavity that extends along a length of the body.

In another aspect, the disclosure relates to a linear luminaire that includes a housing having a first side housing wall and a second side housing wall, where the first side housing wall has a slot disposed on its inner surface, and where the second side housing wall has a slot disposed on its inner surface. The linear luminaire can also include a bracket coupled to the housing. The bracket can include a body having a top body wall, a first side body wall that extends downward from a first side of the top body wall, and a second side body wall that extends downward from a second side of the top body wall. The bracket can also include a first flange that extends outward from a bottom of the first side body wall, where the first flange is slidably disposed within the slot in the first side housing wall of the housing. The bracket can further include a second flange that extends outward from a bottom of the second side body wall, where the second flange is slidably disposed within the slot in the second side housing wall of the housing. The bracket can also include a tab that extends outward from a rear of the first side body wall or the second side body wall, where the tab slidably abuts against a protrusion in the inner surface of the first side housing wall or the second side housing wall of the housing. The top body wall, the first side body wall, and the second side body wall can form a cavity that extends along a length of the body. The bracket can be disposed within a wireway in the housing.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
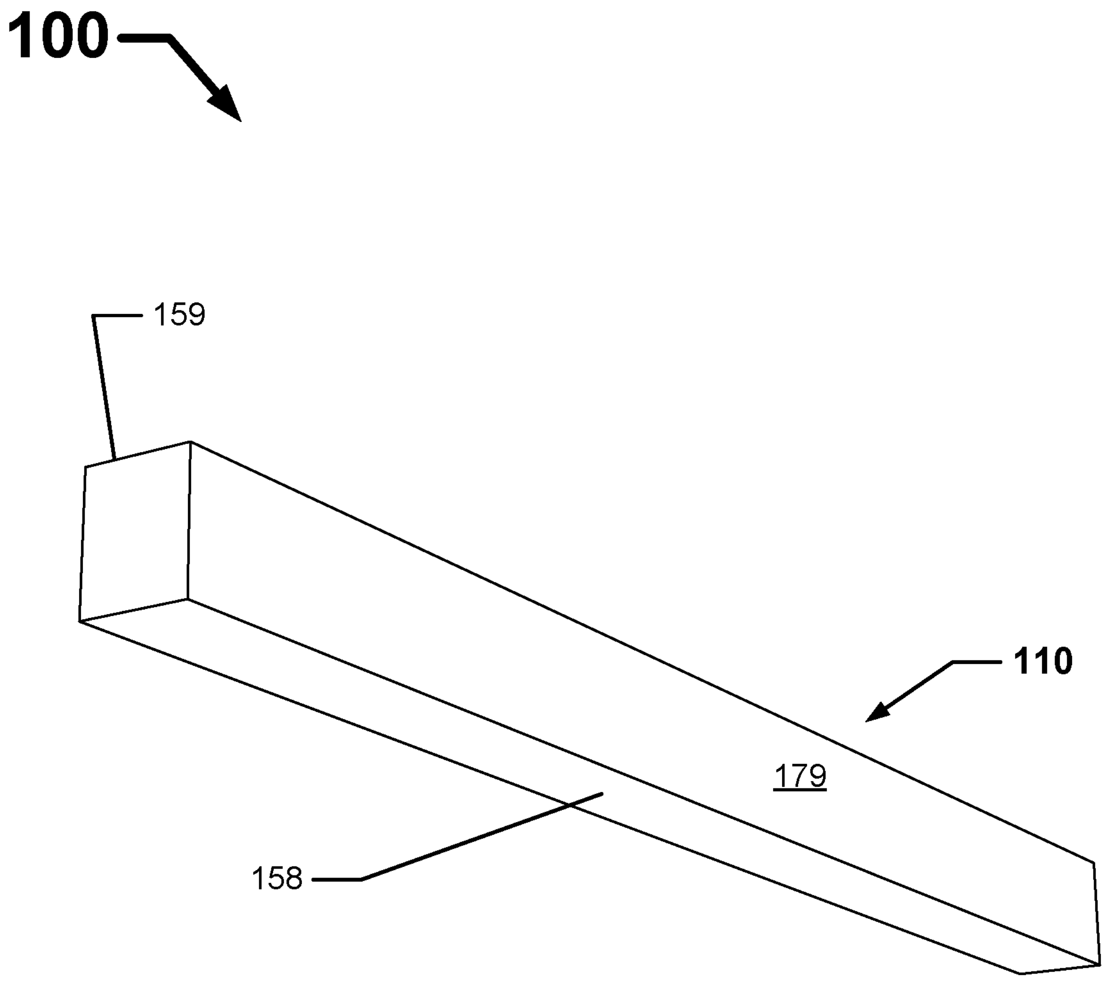
FIG. 1 shows a perspective view of a linear luminaire according to certain example embodiments.

In general, example embodiments provide systems, methods, and devices for brackets for linear luminaires. Example embodiments can provide a number of benefits. Such benefits can include, but are not limited to, fewer parts to keep in inventory, modularity, user control, and tool-less configurability. Example embodiments can be used with new linear luminaires or retrofit with existing linear luminaires. While example embodiments described herein are directed to linear luminaires, example embodiments can be used with other types of luminaires, including but not limited to pendent lights.

Linear luminaires with example brackets can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Linear luminaires with example brackets can be integrated into any of a number of different structures. Such structures can include, but are not limited to, a pole, an I-beam, drywall, wood studs, a tree, a wall, ceiling tile, another component (e.g., a can) of a luminaire assembly, and a building facade. A user may be any person that interacts with linear luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Linear luminaires with example brackets (including portions thereof) can be made of one or more of a number of suitable materials to allow the linear luminaire to meet certain standards and/or regulations while also maintaining durability in light of the one or more conditions under which the linear luminaires and/or other associated components of the linear luminaire can be exposed. Examples of such materials can include, but are not limited to, aluminum, stainless steel, fiberglass, glass, plastic, polymer, ceramic, and rubber.

Example brackets, or portions thereof, described herein can be made from a single piece (as from a mold, injection mold, die cast, or extrusion process). In addition, or in the alternative, example brackets can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example bracket to become coupled, directly or indirectly, to one or more structures (e.g., a ceiling tile, drywall, a housing of a linear luminaire, a frame of the linear luminaire, some other component of the linear luminaire). A coupling feature can include, but is not limited to, a clamp, a portion of a hinge, an aperture, a recessed area, a protrusion, a hole, a slot, a tab, a detent, and mating threads. One portion of an example bracket can be coupled to a structure (e.g., a ceiling tile, drywall, a housing of a linear luminaire, a frame of a linear luminaire, some other component of the linear luminaire) by the direct use of one or more coupling features.

In addition, or in the alternative, a portion of an example bracket can be coupled to a structure (e.g., a ceiling, drywall, a housing of a linear luminaire, a frame of a linear luminaire, some other component of a linear luminaire) using one or more independent devices that interact with one or more coupling features disposed on a component of the bracket. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of brackets for linear luminaires, one or more of the components shown may be omitted, repeated, and/or substituted. Accordingly, example embodiments of brackets for linear luminaires should not be considered limited to the specific arrangements of components shown in any of the figures. For example, features shown in one or more figures or described with respect to one embodiment can be applied to another embodiment associated with a different figure or description.

In certain example embodiments, linear luminaires having example brackets are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections.

Use of example embodiments described herein meet (and/or allow the linear luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of brackets for linear luminaires will be described more fully hereinafter with reference to the accompanying drawings, in which example embodiments of brackets for linear luminaires are shown. Brackets for linear luminaires may, however, be embodied in many different forms and should not be construed as limited to the example embodiments set forth herein. Rather, these example embodiments are provided so that this disclosure will be thorough and complete, and will fully convey the scope of brackets for linear luminaires to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of brackets for linear luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a perspective view of a linear luminaire 100 according to certain example embodiments. The linear luminaire 100 includes a housing 110 and a lens 158 attached to the bottom of the housing 110. The housing 110 includes a side panel 179 and an end cap 159. The linear luminaire 100 of FIG. 1 is not shown mounted to or suspended by a structure, but as discussed above the linear luminaire 100 can be mounted to or suspended by any of a number of structures. The example bracket, discussed in detail below with respect to FIGS. 2A through 2D, is located inside the housing 110 of the linear luminaire 100.

Figure 2A:
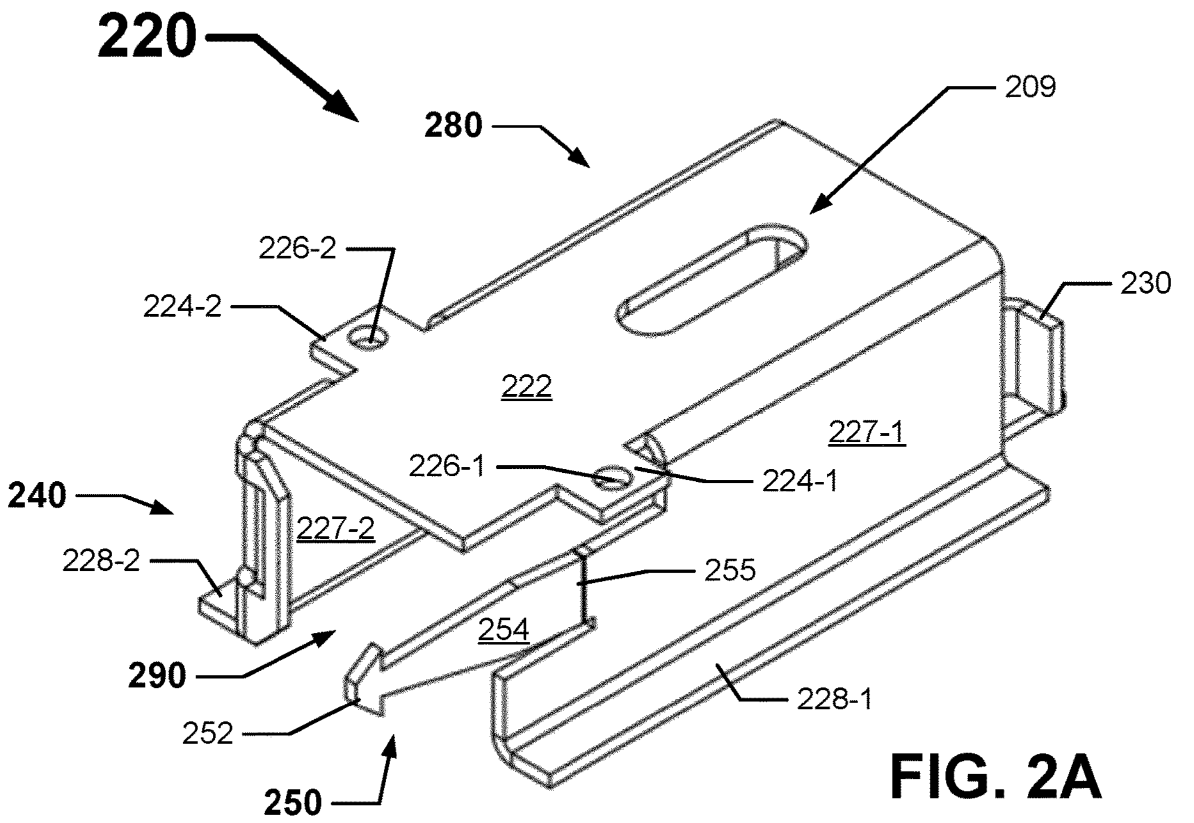
FIGS. 2A through 2D show various views of a bracket according to certain example embodiments.
Figure 2B:
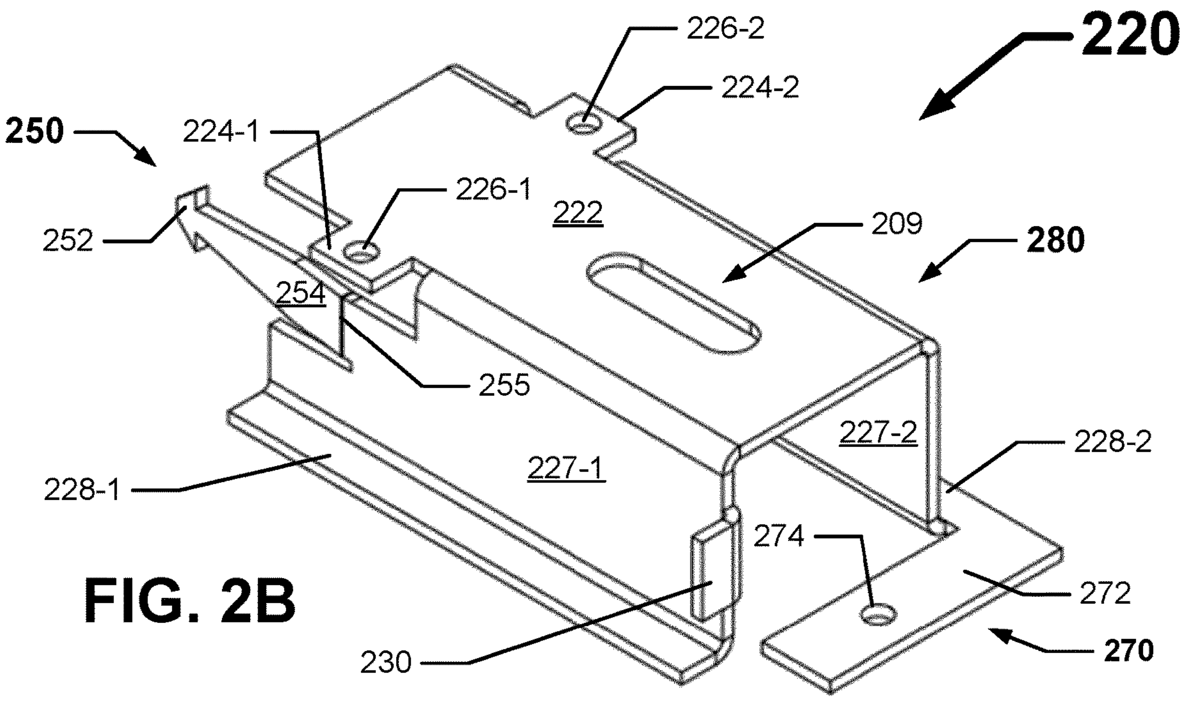
Figure 2C:
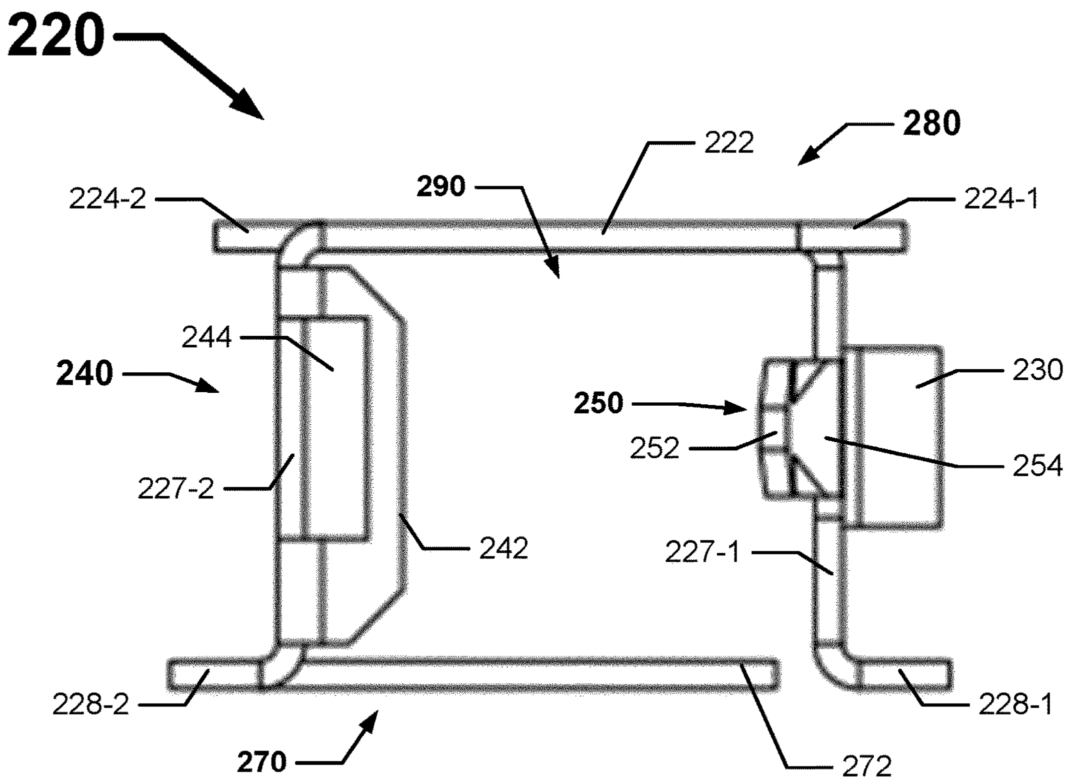
Figure 2D:
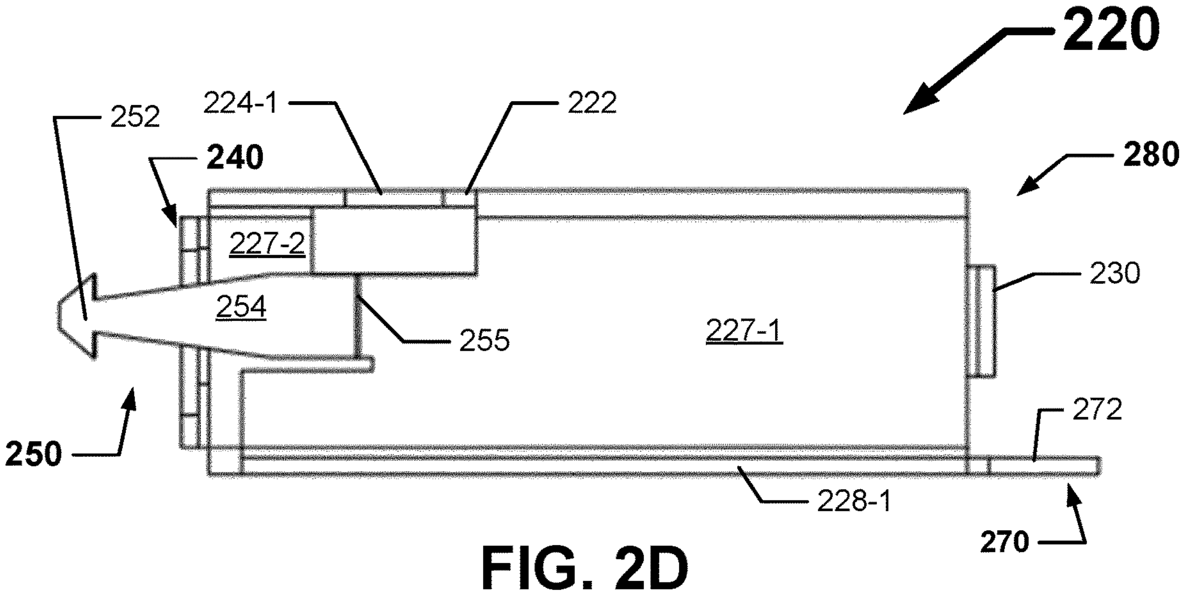

FIGS. 2A through 2D show various views of a bracket 220 according to certain example embodiments. Specifically, FIG. 2A shows a front top perspective view of the bracket 220. FIG. 2B shows a rear top perspective view of the bracket 220. FIG. 2C shows a front view of the bracket 220. FIG. 2D shows a side view of the bracket 220. Referring to FIGS. 1 through 2D, the bracket 220 has a body 280 with a number of features. The body 280 of the bracket 220 can include one or more walls. In this case, the bracket 280 is an upside-down U-shape that includes a top body wall 222, a first side body wall 227-1 that extends downward (e.g., perpendicular) from a first side of the top body wall 222, and a second side body wall 227-2 that extends downward (e.g., perpendicular) from a second side of the top body wall 222. The top body wall 222, the first side body wall 227-1, and the second side body wall 227-2 form a cavity 290 that traverses the length of the bracket 220.

Each side body wall 227 includes one or more features and/or components that allow the bracket 220 to be slideably disposed within the housing 110 of the linear luminaire 100. For example, in this case, each side body wall 227 has a flange 228 that extends outward from the bottom of the side body wall 227. In such a case, each flange 228 can be configured to slide within a slot in the housing 110, as discussed below with respect to FIG. 3. Side body wall 227-1 has a flange 228-1 that extends perpendicularly from the bottom of the side body wall 227-1. Similarly, side body wall 227-2 has a flange 228-2 that extends perpendicularly from the bottom of the side body wall 227-2.

The characteristics (e.g., thickness, angle with respect to the side body wall 227, length, width) of one flange 228 (e.g., flange 228-1) that extends from one side body wall 227 can be the same as, or different than, the corresponding characteristics of another flange 228 (e.g., flange 228-2) that extends from another side body wall 227. A flange 228 can run along the entire length of the adjacent side body wall 227. A flange 228 can be a single flange or multiple flanges that extend away from a side body wall 227. If there are multiple flanges 228 that extend from a side body wall 227, the characteristics (e.g., thickness, angle with respect to the side body wall 227, length, width) of one of those flanges 228 that extends from one side body wall 227 can be the same as, or different than, the corresponding characteristics of one or more of the other flanges 228 that extend from the same side body wall 227.

The top body wall 222 of the body 280 can have one or more coupling features disposed thereon. These coupling features can be used to couple the bracket 220 to another component of the linear luminaire 100 and/or to a structure (e.g., a ceiling, a suspension cable or rod, a wall) for mounting. For example, in this case, the top body wall 222 has three coupling features. Disposed in the approximate center (along its width) and toward the rear of the top body wall 222 is a coupling feature 209, in this case in the form of a slotted aperture, that is used to help mount the linear luminaire 100 to a structure. While there is a single coupling feature 209 used for mounting in this case, the top body wall 222 (or other parts of the bracket 220) can include multiple coupling features that are designed for mounting purposes.

In addition, a pair of coupling features 226, in this case in the form of apertures, are disposed along either side of the top body wall 222. Specifically, coupling feature 226-1 is disposed on one side of the top body wall 222, and coupling feature 226-2 is disposed on the opposite side of the top body wall 222. In this case, coupling feature 226-1 and coupling feature 226-2 in this case are configured substantially identically to each other. In alternative embodiments, coupling feature 226-1 and coupling feature 226-2 can be configured differently from each other. The coupling features 226 in this case are configured to help couple the housing cover (discussed below with respect to FIG. 3) and the bracket 220 to each other. Also in this case, coupling feature 226-1 is disposed in a lateral extension 224-1 on one side of the top body wall 222, and coupling feature 226-2 is disposed in another lateral extension 224-2 on the opposite side of the top body wall 222. In alternative embodiments, the lateral extensions 224 are not part of the bracket 220, or the extensions 224 extend at some non-zero-degree angle relative to the main portion of the top body wall 222.

In certain example embodiments, the bracket 220 includes a control arm 250. The control arm 250 can be used to join adjacent linear luminaires end-to-end by engaging with another bracket of the adjacent linear luminaire. The control arm 250 can extend from a front one of the side body walls 227. In this example, the control arm 250 extends from the front of side body wall 227-1. In some cases, the control arm 250 can be movable with respect to the side body wall 227 to which the control arm 250 is coupled. For example, in this case, the control arm 250 is movably coupled to the side body wall 227-1 by a hinge 255. The hinge 255 can be a living hinge that is integrated with the control arm 250 and the side wall 227. Alternatively, the hinge 225 can be a traditional hinge with a pin that fits between two interlocking hinge plates. Other types of coupling features can be used as an alternative to a hinge 255 to allow the control arm 250 to move with respect to the side body wall 227-1.

Figure 4A:
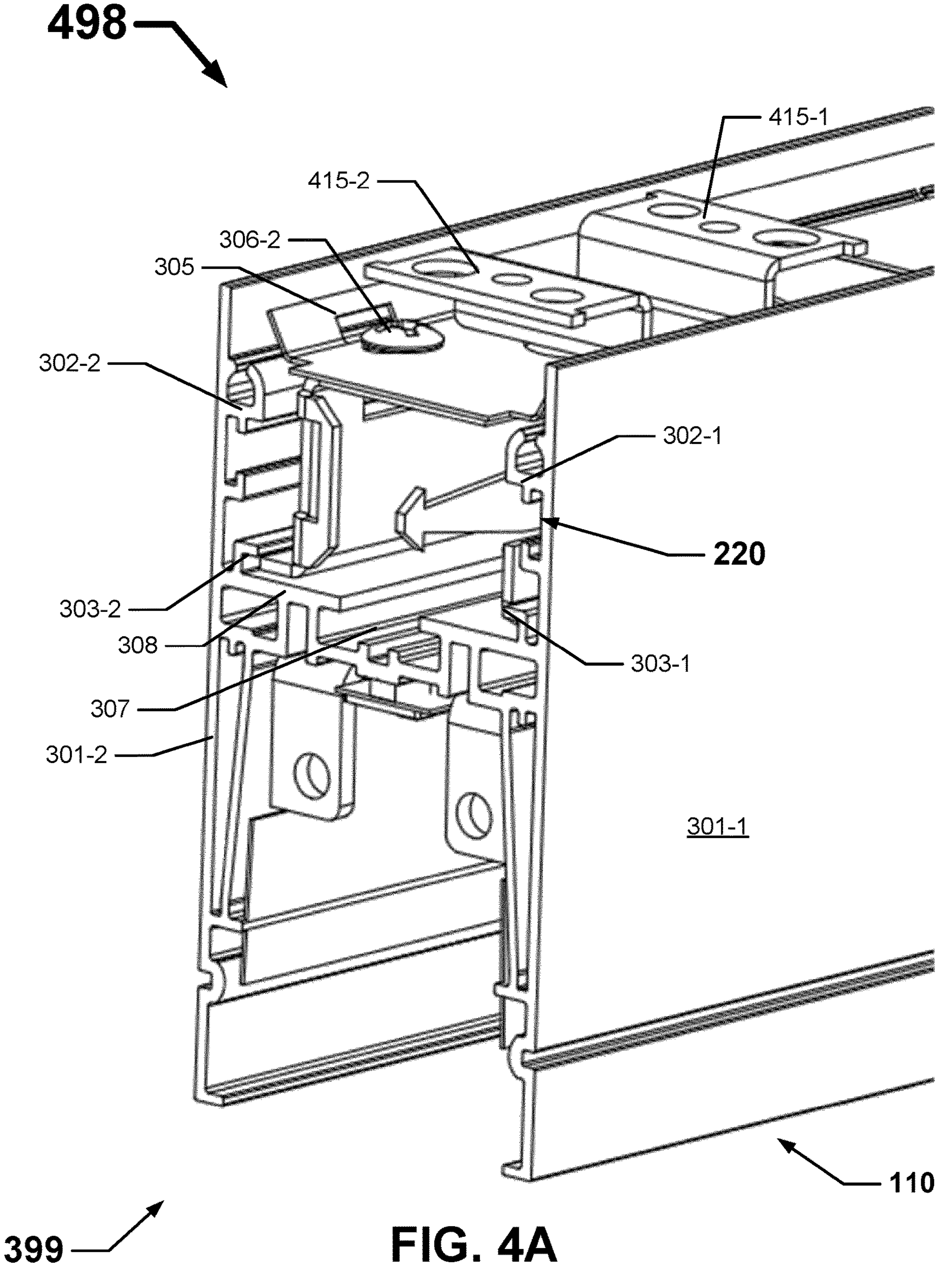
FIGS. 4A and 4B show another subassembly of the linear luminaire of FIG. 1 that includes the subassembly of FIG. 3 according to certain example embodiments.
Figure 4B:
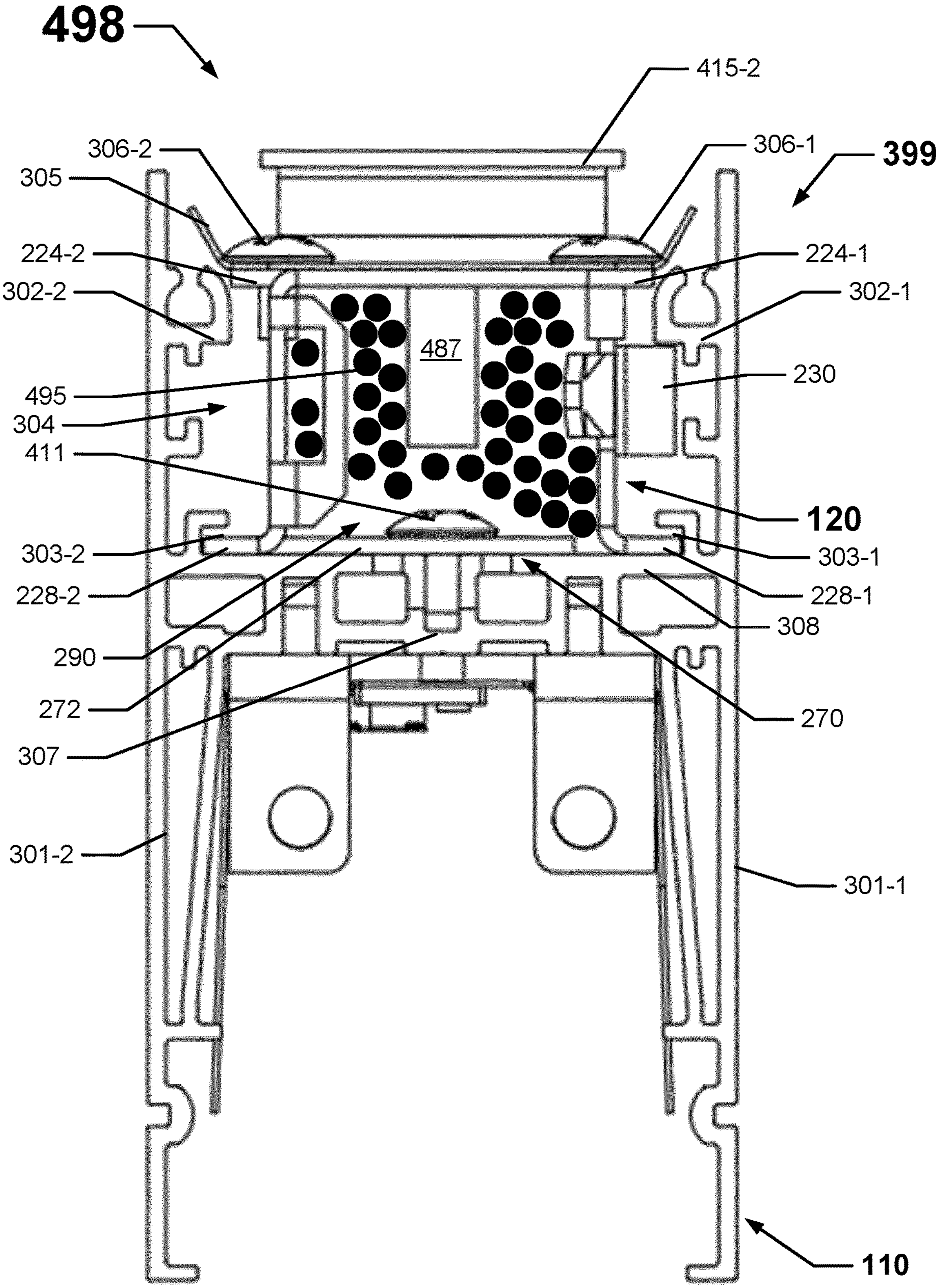
Figure 5:
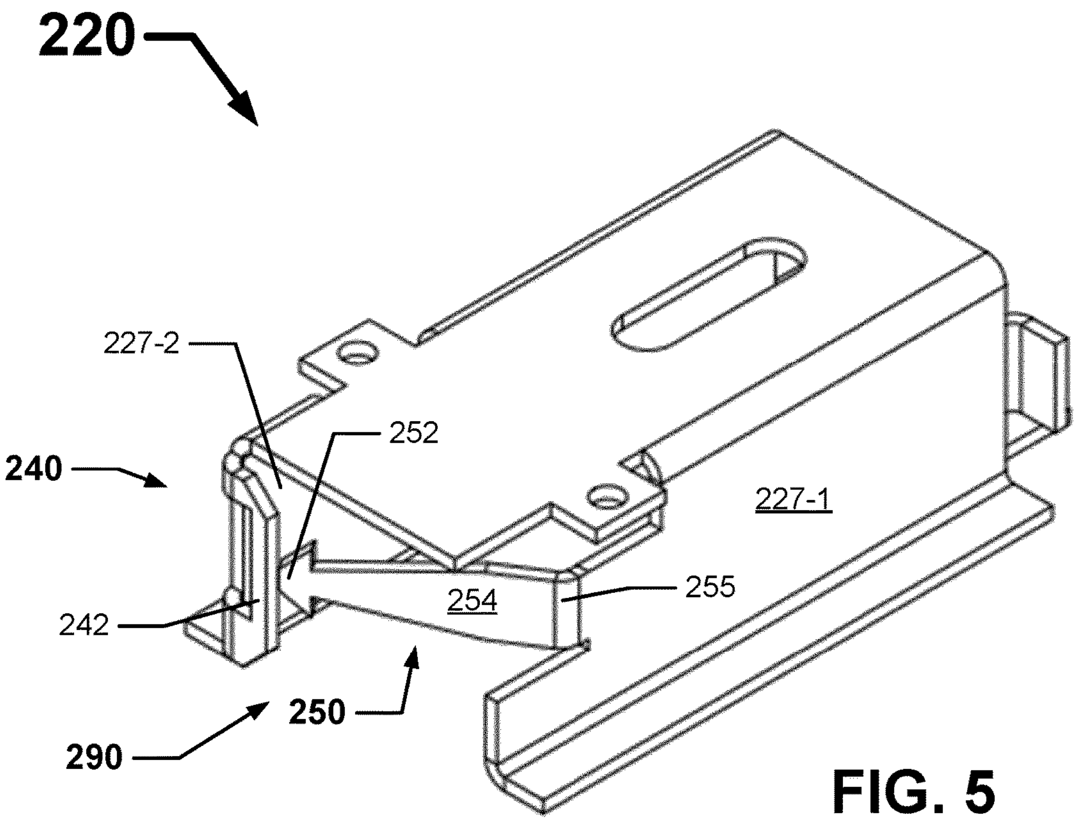
FIG. 5 shows the bracket of FIGS. 2A through 2D with the control arm in a closed position according to certain example embodiments.

Since the control arm 250 is movable, the control arm 250 can have an open position (as shown in FIGS. 4A through 4B) and a closed position (as shown in FIG. 5 below). As described herein, a closed position of the control arm 250 denotes a range of positions where the control arm 250 is not the only distal-most part of the bracket 220. In this example, as shown in FIG. 6D, the control arm 250 is in a closed position as long as the tip 252 of the control arm does not extend further distally outward than the distal surface of the receiving feature 240 (discussed below).

Figure 6A:
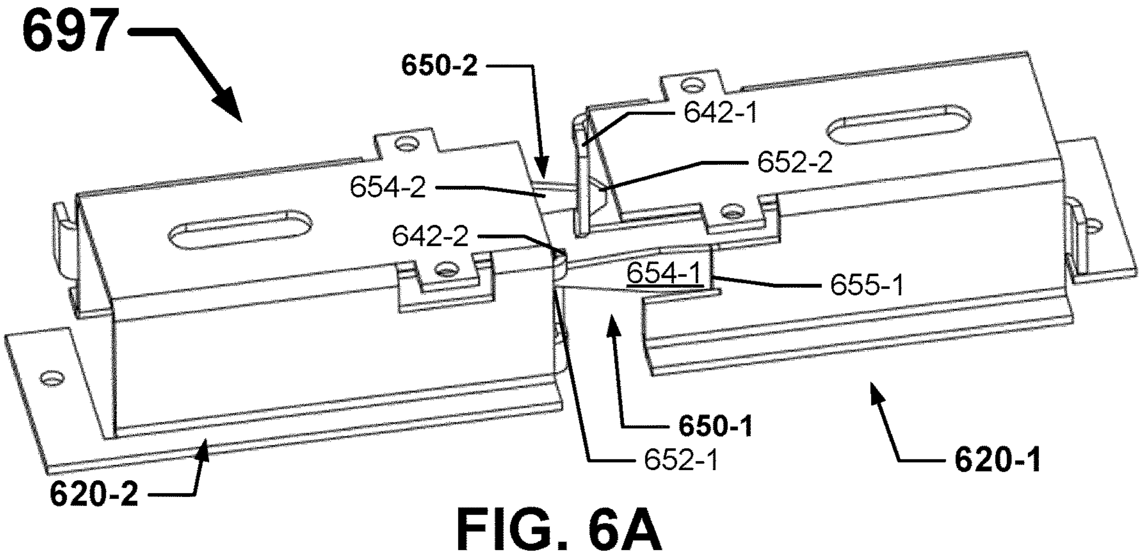
FIGS. 6A through 6C show yet another subassembly that includes two brackets becoming coupled to each other according to certain example embodiments.
Figure 6B:
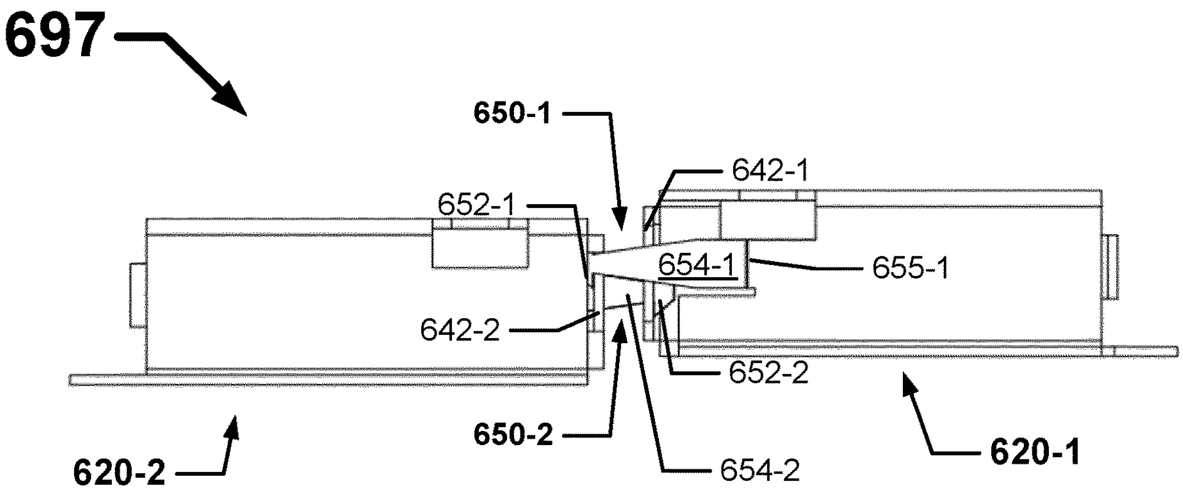
Figure 6C:
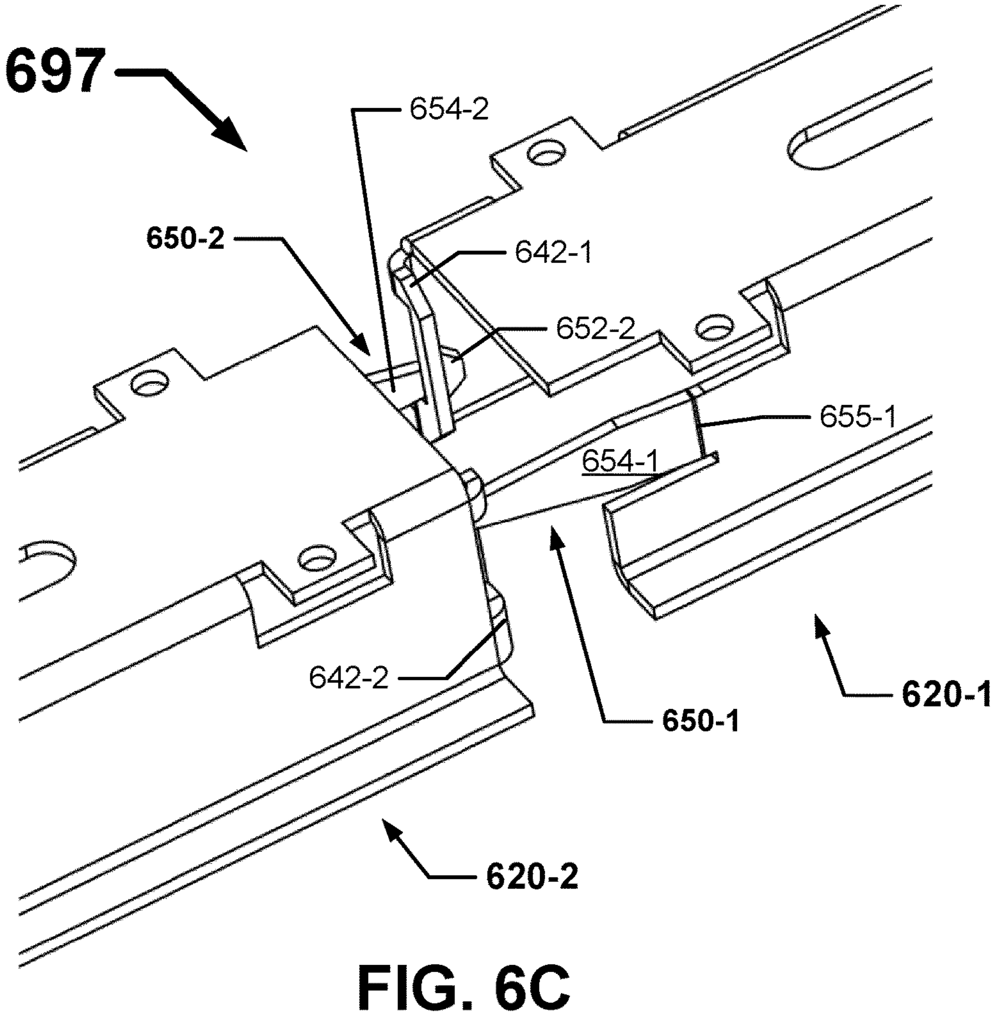

Further, an open position of the control arm 250 denotes a range of positions where the control arm 250 is planar or substantially planar with the side body wall 227 to which the control arm 250 is movably coupled. As shown in FIGS. 6A through 6C below, the control arm 250 is considered to be in an open position when the control arm 250 can engage the receiving feature 240 of another bracket 220. While the control arm 250 can have other positions between what is considered to be open and closed, the control arm 250 cannot practically be used in these intermediary positions when the linear luminaire 100 that includes the bracket 220 is being installed, making those intermediary positions irrelevant for purposes of what is defined as open and closed positions for the control arm 250.

The control arm 250 can have one or more portions and/or one or more features to help facilitate the joining of two adjacent linear luminaires. For example, in this case, the control arm 250 has a body 254 and a tip 252 that is disposed at the distal end of the body 254. The first approximately ⅓ of the body 254, starting from the hinge 255, has top and bottom edges that are substantially parallel with each other. The final approximately ⅔ of the body 254 tapers at a substantially constant rate toward the tip 252. The tip 252 of the control arm 250 is generally the shape of an arrowhead, although in this case the pointed end of the arrowhead shape is truncated. Also, the proximal end of the arrowhead shape of the tip 252 spreads out wider than the width of the body 254 where the body 254 and the tip 252 meet, but the height of the tip 252 does not exceed the greatest height of the body 254 of the control arm 250. The thickness of the control arm 250 in this case is substantially constant along the length of the control arm 250.

In certain example embodiments, the bracket 220 also includes a receiving feature 240 that is also configured to join adjacent linear luminaires end-to-end by engaging with another bracket of the adjacent linear luminaire. In such cases, the receiving feature 240 can engage a control arm of the bracket of the adjacent linear luminaire, while the control arm 250 can engage a receiving feature 240 of the bracket of the adjacent linear luminaire. In this way, the configuration of the control arm 250 of the bracket 220 can be based, at least in part, on the configuration of the receiving feature of the bracket of the adjacent linear luminaire. Similarly, the configuration of the receiving feature 240 of the bracket 220 can be based, at least in part, on the configuration of the control arm of the bracket of the adjacent linear luminaire.

The receiving feature 240 can extend inward from a front of a side body wall 227. In this case, the receiving feature 240 is coupled to and extends inward from the side body wall 227-2. In certain example embodiments, as in this example, the side body wall 227 (e.g., side body wall 227-2) to which the receiving feature 240 is attached is opposite the side body wall 227 (e.g., side body wall 227-1) to which the control arm 250 is attached. The receiving feature 240 can have one or more portions and/or one or more features to help facilitate the joining of two adjacent linear luminaires. For example, in this case, the receiving feature 240 includes a body 242 with an aperture 244 that traverses therethrough. The aperture 244 is adjacent to the side body wall 227-2 and is entirely enclosed by the body 242. In certain example embodiments, the aperture 244 has a width and height that is sufficient to receive the largest part (in this example, the proximal ⅓ of the body 254 at the hinge 255) of the control arm 250.

In certain example embodiments, the bracket 220 also includes one or more features or components that secure the bracket 220 to the housing of the linear luminaire 110 in a fixed position. For example, in this case, the bracket 220 includes a leg extension 270 that extends inward toward the cavity 290 from a rear end of a flange 228. In such a case, the leg extension 270 and the flange 228 can be substantially planar (as in this case). Alternatively, the leg extension 270 can extend away from the flange 228 at some non-zero-degree angle. In some cases, the leg extension 270 can have a body 272 that includes a coupling feature 274 (in this case, in the form of an aperture that traverses the thickness of the body 272) that is configured to couple, directly or indirectly, to a complementary coupling feature on an intermediate wall of the housing 110 of the linear luminaire 100. An example of this is shown below with respect to FIG. 3.

In certain example embodiments, the bracket 220 includes a feature and/or component that is configured to help stabilize the bracket 220 as the bracket 220 slideably moves within the housing 110 of the linear luminaire 100. In this case, the bracket 220 includes a tab 230 that extends outward from the rear of the side body wall 227-1. In alternative embodiments, the tab 230 can extend outward from the rear of the side body wall 227-2. In yet other alternative embodiments, the bracket 220 can have multiple tabs 230 that can extend from some other part (e.g., the front, halfway between the front and the rear) of a side body wall 227. For example, if the bracket 220 has two tabs 230, one tab 230 can extend outward from the rear of the side body wall 227-1, and the other tab 230 can extend outward from the front of the side body wall 227-2. The location of the top of the tab 230 along the height of a side body wall 227 can coincide with a feature (e.g., a protrusion) disposed on an inner surface of a wall of the housing 110 of the linear luminaire 100, as shown below with respect to FIG. 3.

In this case, the tab 230 has substantially the same thickness as the side body wall 227-1, and the tab 230 extends outward substantially perpendicular to the side body wall 227-1. In alternative embodiments, one or more characteristics (e.g., thickness, height, width, location along the length of a side body wall 227, angle of extension relative to the side body wall 227) of the tab 230 can differ from what is shown and described in this example.

Figure 3:
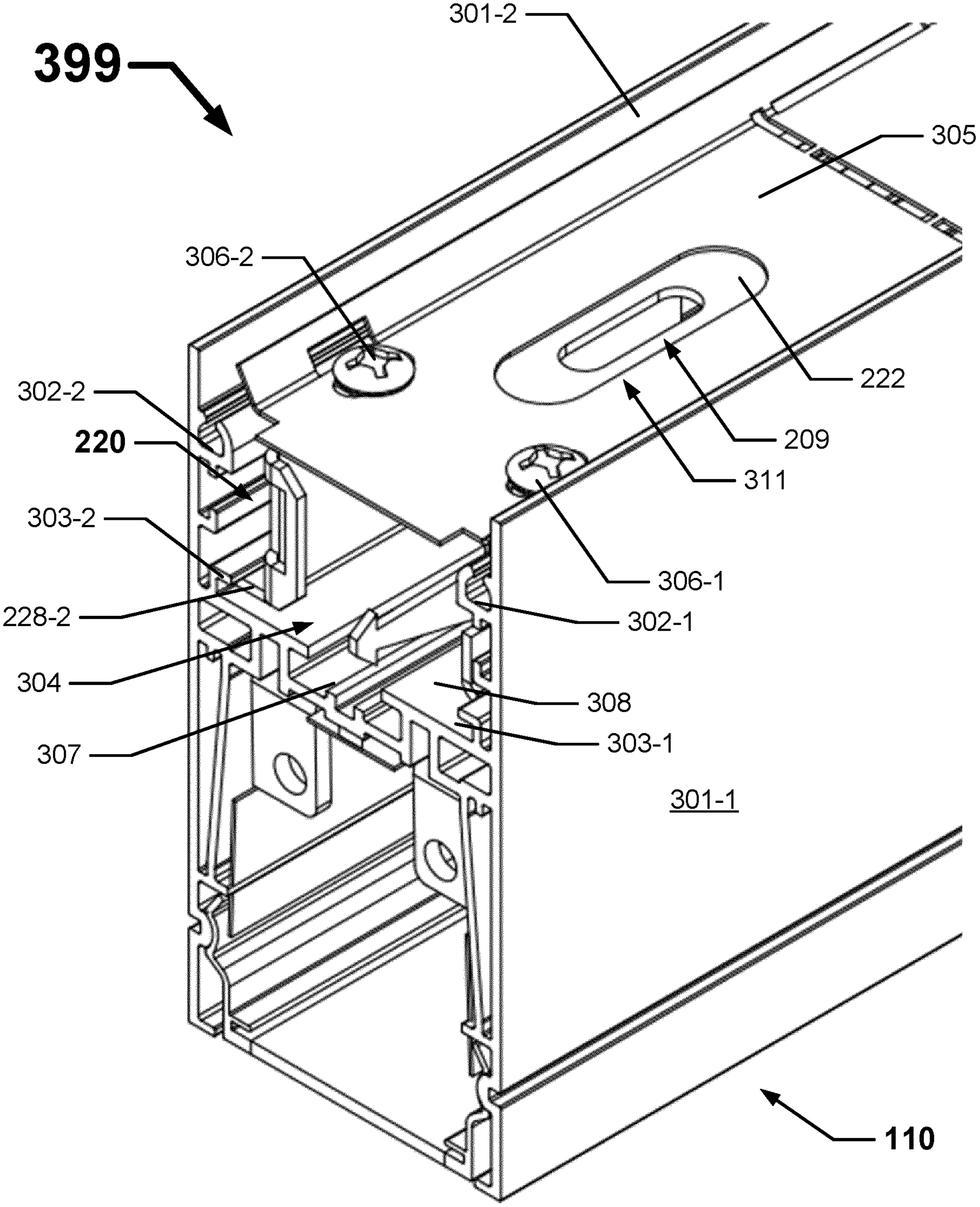
FIG. 3 shows a perspective view of a subassembly of the linear luminaire of FIG. 1A according to certain example embodiments.

FIG. 3 shows a perspective view of a subassembly 399 of the linear luminaire 100 of FIG. 1A according to certain example embodiments. Referring to FIGS. 1 through 3, the subassembly 399 of FIG. 3 shows what is behind the lens 158, the side panel 179, and the end cap 159 of the linear luminaire 100, all of which are omitted from the subassembly 399. Specifically, the subassembly 399 includes the housing 110, a housing cover 305, and the example bracket 220 of FIGS. 2A through 2D. The housing cover 305 is configured to cover the top part of the housing 110. The housing cover 305 can have any of a number of configurations. In this case, the housing cover 305 abuts against and is coupled to the top body wall 222 of the bracket 220.

To couple to the bracket 220, the housing cover 305 can include one or more of a number of coupling features. In this case, the housing cover 305 has multiple coupling features in the form of apertures (hidden from view by coupling features 306 (in this case in the form of screws) disposed in the apertures) that allow the housing cover 305 to be indirectly coupled to the bracket 220. Specifically, coupling feature 306-1 is coupled to one of the coupling features in the enclosure cover 305 and coupling feature 226-1 of the bracket 220, and coupling feature 306-2 is coupled to another of the coupling features in the enclosure cover 305 and coupling feature 226-2 of the bracket 220. In other cases, one or more of the coupling features of the housing cover 305 can allow the housing cover 305 to be directly coupled to the bracket 220.

The housing cover 305 is configured to cover at least some of the top end of the housing 110. In this case, the housing cover 305 covers most of the top end of the housing 110, except for a gap that forms between one side wall 301-1 of the housing 110 and the adjacent side of the housing cover 305, and except for another gap that forms between the other side wall 301-2 of the housing 110 and the adjacent side of the housing cover 305. The housing cover 305 can have any of a number of shapes, sizes, and other configurations. In this case, the housing cover 305 has a main portion that is substantially planar and parallel with the upper surface of the top body wall 222 of the bracket 220 and an angled extension that extends at an angle upward and outward from either side of the main portion of the housing cover 305.

The housing cover 305 also includes a coupling feature 311 that is used for mounting the linear luminaire 100 to a structure (e.g., a suspension cord, drywall that is part of a ceiling for a volume of space, drywall that is part of a side wall for a volume of space, a mounting bracket, a ceiling tile). In this case, the coupling feature 311 is an elongated aperture or slot that traverses the thickness of the main portion of the housing cover 305. The shape and size (e.g., length, width) of the coupling feature 311 of the housing cover 305 can be configured to be coincident with but larger than the corresponding shape and size of the coupling feature 209 disposed in the top body wall 222 of the bracket 220.

The housing 110 of the linear luminaire 100 includes multiple walls. In this case, the housing 110 includes two side walls 301 (side wall 301-1 and side wall 301-2) and an intermediate wall 308. The two side walls 301 and the intermediate wall 308 form a wireway 304 through which one or more electrical cables (which can include a single electrical conductor) can be run. The two side walls 301 are substantially mirror images of each other. Each side wall 301 has a number of features disposed along its inner surface. For example, side wall 301-1 has a protrusion that forms a slot 303-1 with the intermediate wall 308. The slot 303-1 is configured to receive the flange 228-1 of the bracket 220, as shown more clearly in FIG. 4B below. In addition, the side wall 301-1 has another protrusion 302-1, located above the slot 303-1, that extends into the wireway 304. The protrusion 302-1 can be configured to abut against the top of the tab 230 of the bracket 220, as shown more clearly in FIG. 4B below. Similarly, side wall 301-2 has a protrusion that forms a slot 303-2 with the intermediate wall 308. The slot 303-2 is configured to receive the flange 228-2 of the bracket 220. In addition, side wall 301-2 has another protrusion 302-2, located above the slot 303-2, that extends into the wireway 304. The protrusion 302-2 can be configured to abut against the top of the tab 230 of the bracket 220.

The intermediate wall 308 in this case is a substantially horizontal wall that bridges between the side walls 301 of the housing 110. The intermediate wall 308 can define or include one or more of a number of features. For example, in addition to helping form the slots 303 adjacent to the inner surface of each side wall 301, the intermediate wall 308 can include a coupling feature 307. In this case, the coupling feature 307 is in the form of a recess that extends along the length of the intermediate wall 308. The coupling feature 307 can be configured to directly or indirectly couple to a coupling feature (e.g., coupling feature 274) of the bracket 220 to secure the bracket 220 within the wireway 304, as shown in more detail below with respect to FIG. 4B.

FIGS. 4A and 4B show another subassembly 498 of the linear luminaire 100 of FIG. 1 that includes the subassembly 399 of FIG. 3 according to certain example embodiments. Specifically, FIG. 4A shows a perspective view of the subassembly 498, and FIG. 4B shows an end view of the subassembly 498. Referring to FIGS. 1A through 4B, the subassembly 498, in addition to the subassembly 399 of FIG. 3, includes two luminaire mounting features 415 (luminaire mounting feature 415-1 and luminaire mounting feature 415-2) that are coupled to the coupling feature 311 of the main portion of the housing cover 305 and to the coupling feature 209 of the bracket 220 using one or more independent coupling features 487, each in the form of a screw.

As referenced above in the description of FIG. 3, FIG. 4B clearly shows how various features of the bracket 220 interact with various features of the housing 110. For example, FIG. 4B shows the slot 303-1 receiving the flange 228-1 of the bracket 220 and the slot 303-2 receiving the flange 228-2 of the bracket 220. Further, FIG. 4B shows the protrusion 302-1 abutting against the top of the tab 230 of the bracket 220. In addition, FIG. 4B shows coupling feature 411 (in this case, in the form of a screw) that couples to coupling feature 274 of the bracket 220 and coupling feature 307 of the housing 110 to secure the bracket 220 within the wireway 304. Without this latter feature, the bracket 220 could slide within the wireway 304 with no limits or within a non-fixed range of motion.

FIG. 4B also shows another feature of the bracket 220. The size of the cavity 290 formed by the bracket 220, while smaller than the wireway 304 of the housing 110, is still relatively significant (e.g., 90% of size of the wireway 304). As such, a large number (e.g., 10, 20, 30) of electrical cables 495, electrical connectors, and/or other electrical components can fit within the cavity 290 of the bracket 220 without detracting from any of the features of the bracket 220. As such, the bracket 220 can allow for larger light fixtures in the form of a greater number of end-to-end linear luminaires 110.

FIG. 5 shows the bracket 220 of FIGS. 2A through 2D with the control arm 250 in a closed position according to certain example embodiments. Referring to FIGS. 1 through 5, the bracket 220 of FIG. 5 is identical to the bracket 220 of FIGS. 2A through 2D, except that the control arm 250 is moved to the closed position as opposed to the open position of the swing arm shown in FIGS. 2A through 2D. In the closed position, the tip 252 of the swing arm 250 is moved toward the side body wall 227-2, which is opposite from the side body wall 227-1 from which the swing arm 250 extends. In certain example embodiments, the distal end of the tip 252 of the control arm 250 avoids contact with the body 242 of the receiving feature 240 of the bracket 220. When the control arm 250 is in the closed position, the body 254 of the swing arm 250 blocks off a majority of the cavity 290. The swing arm 250 can be placed in the closed position when that end of that linear luminaire represents the end of the light fixture and so requires an end cap (e.g., end cap 159). By moving the swing arm 250 to the closed position, the end cap can be fitted to the end of the linear luminaire 100. This can be seen more clearly in FIGS. 7A and 7B below.

FIGS. 6A through 6C show yet another subassembly 697 that includes two brackets 620 becoming coupled to each other according to certain example embodiments. Referring to FIGS. 1 through 6C, the subassembly 697 of FIGS. 6A through 6C shows bracket 620-1 and bracket 620-2. In this case, bracket 620-1 and bracket 620-2 are facing each other so that the two can become coupled to each other. When bracket 620-1 and bracket 620-2 are installed in two adjacent linear luminaires, the process shown in FIGS. 6A through 6C equally applies. Bracket 620-1 and bracket 620-2 are substantially the same as the bracket 220 of FIGS. 2A through 2D above. For example, the swing arm 650-1 of bracket 620-1 and the swing arm 650-2 of bracket 620-2 of FIGS. 6A through 6C are substantially the same as the swing arm 250 of the bracket 220 of FIGS. 2A through 2D. Similarly, the receiving feature 640-1 of bracket 650-1 and the receiving feature 640-2 of bracket 650-2 of FIGS. 6A through 6C are substantially the same as the receiving feature 240 of the bracket 220 of FIGS. 2A through 2D.

By facing each other, and with both control arm 650-1 and control arm 650-2 in the open position (e.g., fully open or nearly fully open), the control arm 650-1 of the bracket 650-1 is aligned to engage with the aperture (e.g., aperture 244) formed within the body 642-2 of the receiving feature 640-2 of the bracket 650-2, and substantially simultaneously the control arm 650-2 of the bracket 650-2 is aligned to engage with the aperture formed within the body 642-1 of the receiving feature 640-1 of the bracket 650-1. This is shown in FIG. 6A. By moving one bracket 620 (e.g., bracket 620-2) toward the other bracket 620 (e.g., bracket 620-1), or by moving both brackets 620 toward each other at the same time, the control arm 650-1 of the bracket 650-1 becomes engaged with the aperture of the receiving feature 640-2 of the bracket 650-2, and substantially simultaneously the control arm 650-2 of the bracket 650-2 becomes engaged with the aperture of the receiving feature 640-1 of the bracket 650-1, as shown in FIGS. 6B and 6C.

In practice, one bracket 620 (in this case, bracket 620-1) is part of a linear luminaire (e.g., linear luminaire 100) that is already mounted to a structure, and the other bracket 620 (in this case, bracket 620-2) is part of another linear luminaire that is being abutted end-to-end with the mounted linear luminaire to extend the length of the light fixture. As such, there needs to be some vertical displacement between bracket 620-1 and bracket 620-2 until the linear luminaire associated with bracket 620-2 is also mounted to a structure (e.g., a ceiling) by a user (e.g., an installer).

Because the tip 652 if each control arm 650 is shaped as an arrowhead (or some similar configuration where the height of the proximal end of the tip 652 exceeds the height of the distal end of the body 654), once the tip 652 of a control arm 650 passes through the aperture (e.g. substantially the same as aperture 244 of the bracket 220) of the opposing receiving feature 640, the proximal end of the arrowhead shape of the tip 652, in light of the relatively smaller height of the distal end of the body 654 of the same control arm 650, can remain engaged with the aperture of the opposing receiving feature 640, even when the body 654 (or a significant portion thereof) of that control arm 650 has not been pushed through the aperture of the opposing receiving feature 640.

This engagement of the tip 654 of the control arm 650 of one bracket 650 with the body 642 and aperture therein of the receiving feature 640 of the other bracket 650 allows the non-mounted bracket 650 (in this case bracket 650-2), as well as the non-mounted linear luminaire in which the non-mounted bracket 650 is disposed, can remain suspended without a user having to hold the non-mounted linear luminaire. In other words, a user can use both hands, allowing the non-mounted linear luminaire to be freely but securely suspended, to pull electrical cables (e.g., electrical cables 495), couple ends of electrical connectors, perform any other steps needed to prepare the non-mounted linear luminaire, and eventually mount the non-mounted linear luminaire while the control arm 650 of each bracket 620 is engaged with the receiving feature 640 of the other bracket 620, as shown in FIGS. 6B and 6C.

As the bracket 620-2 is pushed further toward the bracket 620-1, because of the tapered shape of the body 654 of the control arm 650 for each bracket 620, the height of the portion of the body 654 of the control arm 650 of one bracket 620 that is disposed within the aperture in the body 642 of the receiving feature 640 of the other bracket 620 increases, thereby reducing the amount of vertical tilt and/or vertical displacement allowed between the two brackets 620. When the height of the proximal third of the body 654 of the control arm 650 of one bracket 620 is substantially the same as (e.g., slightly less than) the height of the aperture in the body 642 of the receiving feature 640 of another bracket 620, the amount of vertical tilt and/or vertical displacement between the two brackets 620 is essentially zero.

Figure 7A:
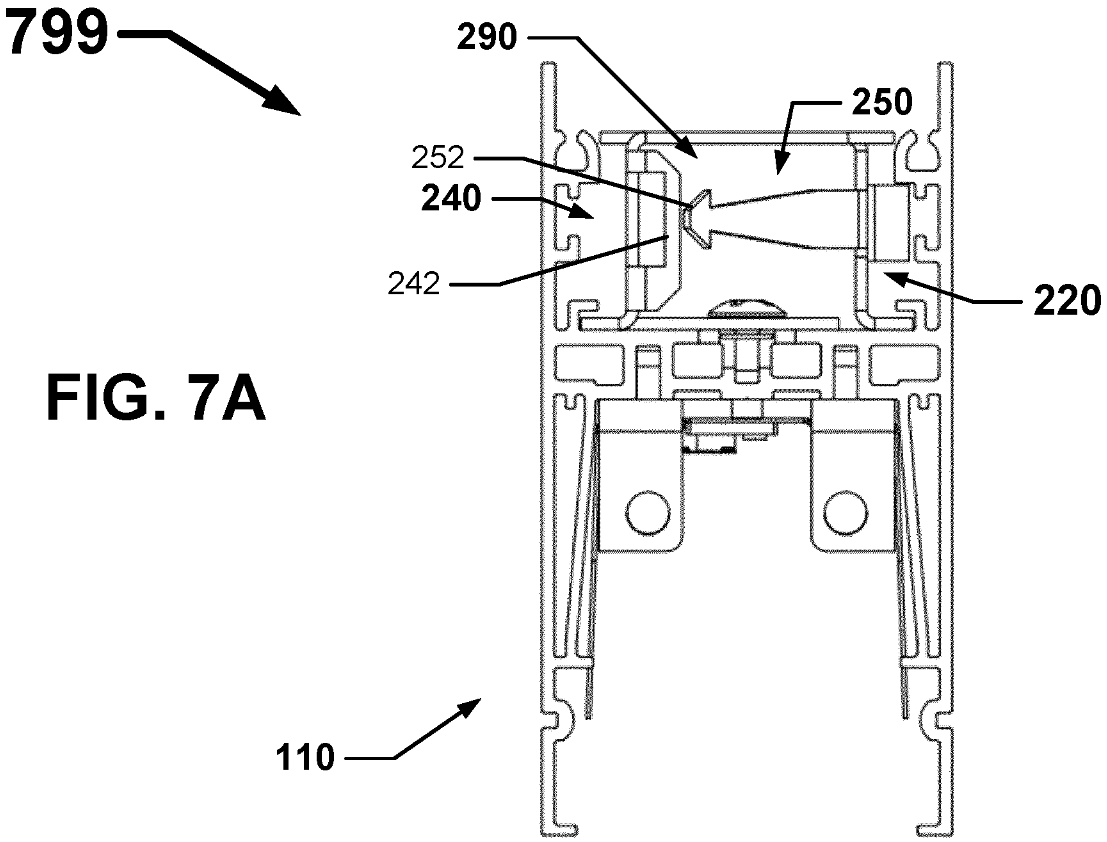
FIGS. 7A and 7B show various views of still another subassembly according to certain example embodiments.
Figure 7B:
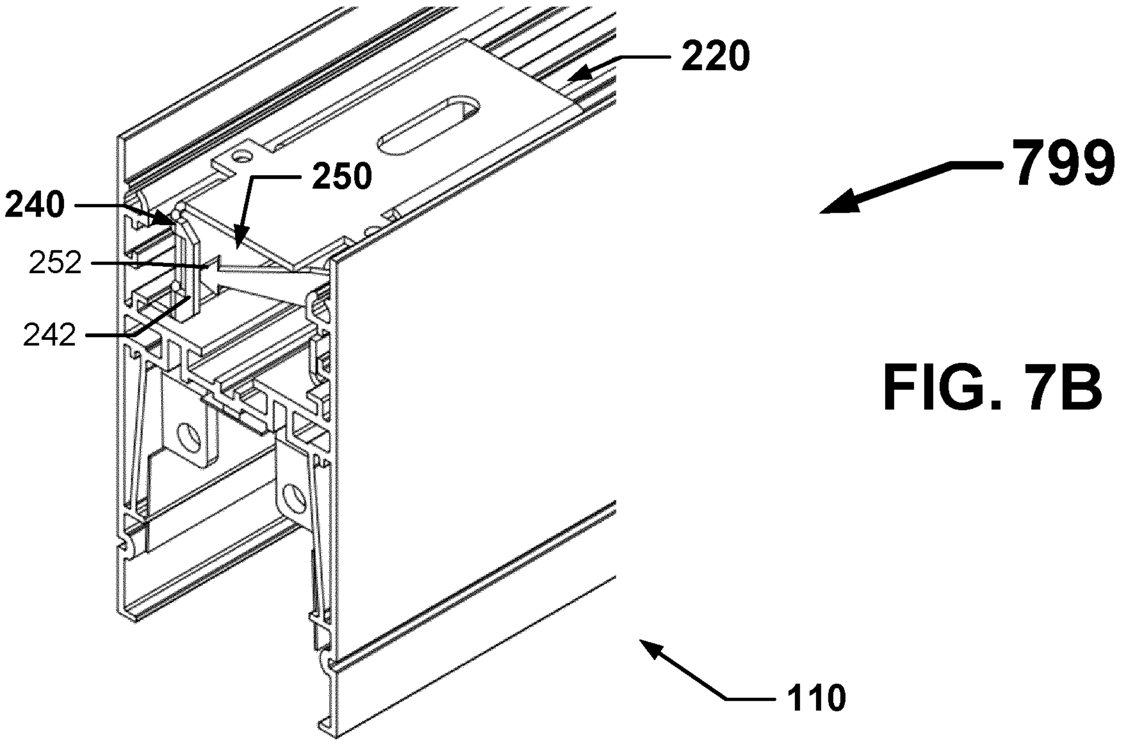

FIGS. 7A and 7B show various views of still another subassembly 799 according to certain example embodiments. Specifically, FIG. 7A shows an end view of the subassembly 799, and FIG. 7B shows a perspective view of the subassembly 799. Referring to FIGS. 1 through 7B, the subassembly 799 of FIGS. 7A and 7B is identical to the subassembly 399 of FIG. 3 except that the control arm 250 of the bracket 220 in FIGS. 7A and 7B is in the closed position. When the control arm 250 is in the closed position, and based on where the bracket 220 is positioned relative to the distal end of the housing 110, the control arm 250 does not extend beyond the distal end of the housing 110. This allows an end cap (e.g., end cap 159) to be affixed to the housing 110.

As stated above, when the control arm 250 is in the closed position, the control arm 250 closes off a significant portion of the cavity 290 that runs through the bracket 220. Also, when the control arm 250 is placed in the closed position, the distal end of the tip 252 avoids contact with the body 242 of the receiving feature 240 of the bracket 220, allowing the control arm 250 to swing far enough inward to ensure that the control arm 250 does not interfere with the complete coupling of the end cap (e.g., end cap 159) to the housing 110.

Example embodiments can be used to serve multiple functions for a linear luminaire or a light fixture made up of multiple linear luminaires abutted end-to-end. Example embodiments can be used to allow access to most of the wireway in the housing of a linear luminaire. Example brackets (or portions thereof) can be installed, removed, and/or changed from a linear luminaire without the use of a tool (e.g., a screwdriver, a wrench) or with the minimal use of a tool. Example embodiments can also provide flexibility as to how an adjacent linear luminaire can be secured in the field at the time of installation. Example embodiments can be used with linear luminaires having any of a number of mounting systems and features. Example embodiments can be used in new installations of linear luminaires as well as retrofitting or replacing existing linear luminaires. Example embodiments also provide a number of other benefits. Such other benefits can include, but are not limited to, increased ease of installation, increased ease of maintenance, greater ease of use, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A bracket for a linear luminaire, the bracket comprising:

a body comprising a top body wall, a first side body wall that extends downward from a first side of the top body wall, and a second side body wall that extends downward from a second side of the top body wall;

a first flange that extends outward from a bottom of the first side body wall, wherein the first flange is configured to be slidably disposed within a first slot in a first side housing wall of a housing of the linear luminaire;

a second flange that extends outward from a bottom of the second side body wall, wherein the second flange is configured to be slidably disposed within a first slot in a second side housing wall of the housing of the linear luminaire; and a tab that extends outward from and along a portion of a rear of the first side body wall or the second side body wall, wherein a portion of the tab is perpendicular to the first or second side body wall, and wherein the tab is configured to slidably abut against a protrusion in the first side housing wall or the second side housing wall of the housing of the linear luminaire, wherein the top body wall, the first side body wall, and the second side body wall form a cavity that extends along a length of the body.

2. The bracket of claim 1, wherein the top body wall comprises a coupling feature that is configured to couple to a luminaire mounting feature.

3. The bracket of claim 1, wherein the top body wall comprises a first housing cover coupling feature that is configured to couple to a first complementary coupling feature of a housing cover of the linear luminaire, and wherein the top body wall further comprises a second housing coupling feature that is configured to couple to a second complementary coupling feature of the housing cover.

4. The bracket of claim 3, wherein the first housing cover coupling feature is disposed in a first lateral extension on the first side of the top body wall, and wherein the second housing cover coupling feature is disposed in a second lateral extension on the second side of the top body wall.

5. The bracket of claim 1, further comprising:

a control arm that extends from a front of the first side body wall or the second side body wall, wherein the control arm is movably coupled to the first side body wall or the second side body wall by a hinge, wherein the control arm has an open position and a closed position; and a receiving feature that extends inward from a front of the second side body wall or the first side body wall opposite the extension.

6. The bracket of claim 5, wherein the control arm, when in the closed position, closes off the cavity at a front end of the body.

7. The bracket of claim 5, wherein the control arm avoids direct contact with the receiving feature when the control arm moves between the open position and the closed position.

8. The bracket of claim 5, wherein the control arm, when in the open position, is configured to engage an additional receiving feature of an additional bracket when the linear luminaire is being abutted against an additional linear luminaire, and wherein the receiving feature is configured to receive an additional control arm of the additional bracket of the additional linear luminaire.

9. The bracket of claim 1, further comprising:

a leg extension that extends inward toward the cavity from a rear of the first flange or the second flange, wherein the leg extension comprises a coupling feature that is configured to couple to a complementary coupling feature on an interior wall of the housing of the linear luminaire.

10. The bracket of claim 9, wherein the coupling feature of the leg extension is disposed in a body of the leg extension.

11. A linear luminaire comprising:

a housing comprising a first side housing wall and a second side housing wall, wherein the first side housing wall has a slot disposed on its inner surface, and wherein the second side housing wall has a slot disposed on its inner surface; and a bracket coupled to the housing, wherein the bracket comprises:

a body comprising a top body wall, a first side body wall that extends downward from a first side of the top body wall, and a second side body wall that extends downward from a second side of the top body wall;

a first flange that extends outward from a bottom of the first side body wall, wherein the first flange is slidably disposed within the slot in the first side housing wall of the housing;

a second flange that extends outward from a bottom of the second side body wall, wherein the second flange is slidably disposed within the slot in the second side housing wall of the housing; and a tab that extends outward from a rear of the first side body wall or the second side body wall, wherein the tab slidably abuts against a protrusion in the inner surface of the first side housing wall or the second side housing wall of the housing, wherein the top body wall, the first side body wall, and the second side body wall form a cavity that extends along a length of the body, and wherein the bracket is disposed within a wireway in the housing.

12. The linear luminaire of claim 11, further comprising:

a housing cover couples to the bracket, wherein the top body wall of the bracket comprises a first housing cover coupling feature that is configured to couple to a first complementary coupling feature of the housing cover, and wherein the top body wall of the bracket further comprises a second housing coupling feature that is configured to couple to a second complementary coupling feature of the housing cover.

13. The linear luminaire of claim 12, further comprising:

a luminaire mounting feature coupled to the housing cover and bracket, wherein the bracket comprises a coupling feature that is configured to couple to the luminaire mounting feature.

14. The linear luminaire of claim 11, further comprising:

a plurality of electrical wires disposed within the cavity along the length of the body of the bracket.

15. The linear luminaire of claim 11, wherein the bracket further comprises a leg extension that extends inward toward the cavity from a rear of the first flange or the second flange, wherein the leg extension comprises a coupling feature that couples to a complementary coupling feature on an interior wall of the housing.

* * * * *